US010051482B2

(12) United States Patent
Xiao et al.

(10) Patent No.: US 10,051,482 B2
(45) Date of Patent: Aug. 14, 2018

(54) METHOD AND APPARATUS FOR ADJUSTING AIR INTERFACE CAPACITY DENSITY

(71) Applicant: Huawei Technologies Co., Ltd., Shenzhen (CN)

(72) Inventors: Wei Xiao, Shanghai (CN); Dingzhi Li, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/607,116

(22) Filed: May 26, 2017

(65) Prior Publication Data

US 2017/0265085 A1  Sep. 14, 2017

Related U.S. Application Data

(63) Continuation of application No. PCT/CN2014/092621, filed on Nov. 29, 2014.

(51) Int. Cl.
*H04W 40/00* (2009.01)
*H04W 16/24* (2009.01)
(Continued)

(52) U.S. Cl.
CPC ....... *H04W 16/24* (2013.01); *H04W 28/0205* (2013.01); *H04W 72/04* (2013.01); *H04W 72/12* (2013.01)

(58) Field of Classification Search
CPC ............. H04W 72/04; H04W 72/0486; H04W 72/082; H04W 76/02; H04W 16/06;
(Continued)

(56) References Cited

U.S. PATENT DOCUMENTS

2011/0096736 A1   4/2011  Kwon et al.
2011/0141895 A1*  6/2011  Zhang ................ H04L 12/66
                                              370/235
(Continued)

FOREIGN PATENT DOCUMENTS

CN    101854643 A    10/2010
CN    103220111 A     7/2013
(Continued)

OTHER PUBLICATIONS

Sundaresan et al.,"FluidNet: A Flexible Cloud-based Radio Access Network for Small Cells," Proceedings of the 19th Annual International Conference on Mobile Computing & Networking, pp. 99-110, XP055256070, MOBICOM'13, (Sep. 30-Oct. 4, 2013).

*Primary Examiner* — Temica M Beamer
(74) *Attorney, Agent, or Firm* — Leydig, Voit & Mayer, Ltd.

(57) ABSTRACT

Embodiments of the present invention disclose a method and an apparatus for adjusting air interface capacity density, where the method includes: determining whether a target physical cell whose air interface capacity density needs to be adjusted exists in a logical cell, where the logical cell includes one or more physical cells, each physical cell includes a group of pico radio remote units pRRUs, and one physical cell corresponds to one baseband tributary; and when a determining result is that a target physical cell whose air interface capacity density needs to be adjusted exists in the logical cell, adjusting the air interface capacity density of the target physical cell. Therefore, by implementing the embodiments of the present invention, air interface capacity density of a physical cell in a logical cell can be dynamically adjusted according to an actual situation of the physical cell.

19 Claims, 5 Drawing Sheets

(51) Int. Cl.
*H04W 28/02* (2009.01)
*H04W 72/12* (2009.01)
*H04W 72/04* (2009.01)

(58) Field of Classification Search
CPC ..... H04W 16/08; H04W 16/10; H04W 16/14; H04W 28/16; H04W 28/08; H04W 28/085; H04W 24/02; H04W 74/02; H04W 36/22; H04W 36/30; H04W 36/08; H04W 36/12; H04W 36/14; H04W 36/18
USPC .............................. 455/452.1, 453, 436, 442
See application file for complete search history.

(56) References Cited

U.S. PATENT DOCUMENTS

| | | |
|---|---|---|
| 2012/0155446 A1 | 6/2012 | Machida |
| 2012/0224541 A1 | 9/2012 | Yoshiuchi et al. |
| 2012/0281556 A1* | 11/2012 | Sayana ................ H04B 7/024 370/252 |
| 2013/0244640 A1* | 9/2013 | Viorel ............... H04W 56/0005 455/422.1 |
| 2014/0031049 A1 | 1/2014 | Sundaresan et al. |
| 2014/0161447 A1 | 6/2014 | Graves et al. |
| 2015/0222345 A1* | 8/2015 | Chapman ............ H04B 7/0617 370/332 |
| 2015/0319755 A1 | 11/2015 | Zhan |
| 2016/0174103 A9* | 6/2016 | Harrang ................ H04W 28/08 455/405 |
| 2016/0295484 A1* | 10/2016 | Saska .................... H04W 48/02 |
| 2017/0156094 A1* | 6/2017 | Lei ........................ H04W 36/08 |

FOREIGN PATENT DOCUMENTS

| | | |
|---|---|---|
| CN | 103281736 A | 9/2013 |
| CN | 103856949 A | 6/2014 |
| EP | 2469940 A2 | 6/2012 |
| JP | 2012134708 A | 7/2012 |
| JP | 2012182792 A | 9/2012 |
| KR | 20110045936 A | 5/2011 |
| KR | 20140010522 A | 1/2014 |

* cited by examiner

METHOD AND APPARATUS FOR ADJUSTING AIR INTERFACE CAPACITY DENSITY

CROSS-REFERENCE TO RELATED APPLICATIONS

This application is a continuation of International Application No. PCT/CN2014/092621, filed on Nov. 29, 2014, the disclosure of which is hereby incorporated by reference in its entirety.

TECHNICAL FIELD

Embodiments of the present invention relate to the field of mobile communications technologies, and specifically, to a method and an apparatus for adjusting air interface capacity density.

BACKGROUND

A radio remote unit (RRU) multi-site cell technology refers that signals of multiple RRUs are processed as signals of one cell on a baseband. This technology is mainly applied to an indoor coverage scenario. Indoor coverage is a scheme used to improve a mobile communications environment inside a building for indoor user groups, and the scheme is widely applied. Along with rapid development of mobile communications technologies, more than 70% of mobile communications traffic occurs indoors, and a demand of the indoor coverage on an air interface capacity also continuously increases.

Generally, large indoor coverage is divided into multiple logical cells according to a specific division rule (for example, distribution of traffic and population and the like), and a fixed air interface capacity is deployed for each logical cell. In actual application, load of logical cells is often imbalanced. When one of the logical cells is overloaded (for example, population and traffic are congested), the logical cell is referred to as "an overloaded logical cell". A fixed air interface capacity of the overloaded logical cell cannot meet an access requirement of user equipment (UE) in the overloaded logical cell, which degrades user experience. However, another logical cell may have a large amount of idle air interface capacities, which causes a waste of an air interface capacity.

Currently, for the foregoing case in which the air interface capacity of the overloaded logical cell is insufficient whereas the air interface capacity of the another logical cell is idle, the prior art provides a solution of "automatic combination and splitting of a logical cell", that is, a base station determines combination or splitting of a logical cell according to a load status of the logical cell. When the logical cell is overloaded, the overloaded logical cell is split, and the base station adds a cell license (License) resource to a newly added logical cell. However, because the load status of the logical cell changes over time and does not last for long, which causes a waste of the cell license resource. When UE connected to an air interface exists in a coverage area of a to-be-adjusted (split or combined) logical cell, the UE needs to be reconnected to a new logical cell, which causes air interface connection interruption (that is, service interruption) for the UE.

SUMMARY

Embodiments of the present invention disclose a method and an apparatus for adjusting air interface capacity density, which can dynamically adjust air interface capacity density of a physical cell in a logical cell.

A first aspect of the embodiments of the present invention discloses an apparatus for adjusting air interface capacity density, including:

a determining module, configured to determine whether a target physical cell whose air interface capacity density needs to be adjusted exists in a logical cell, where the logical cell includes one or more physical cells, each physical cell includes a group of pico radio remote units (pRRUs), and one physical cell corresponds to one baseband tributary; and an adjusting module, configured to: when a determining result of the determining module is that a target physical cell whose air interface capacity density needs to be adjusted exists in the logical cell, adjust the air interface capacity density of the target physical cell.

In a first possible implementation manner of the first aspect of the embodiments of the present invention, a specific manner in which the determining module determines whether a target physical cell whose air interface capacity density needs to be adjusted exists in the logical cell is:

determining whether a target physical cell whose air interface capacity density needs to be reduced exists in the logical cell; or determining whether a target physical cell whose air interface capacity density needs to be increased exists in the logical cell.

With reference to the first possible implementation manner of the first aspect of the embodiments of the present invention, in a second possible implementation manner of the first aspect of the embodiments of the present invention, when the determining module determines that a target physical cell whose air interface capacity density needs to be increased exists in the logical cell, a specific manner in which the adjusting module adjusts the air interface capacity density of the target physical cell is:

reducing a quantity of pRRUs in the target physical cell.

With reference to the first possible implementation manner of the first aspect of the embodiments of the present invention, in a third possible implementation manner of the first aspect of the embodiments of the present invention, when the determining module determines that a target physical cell whose air interface capacity density needs to be increased exists in the logical cell, a specific manner in which the adjusting module adjusts the air interface capacity density of the target physical cell is:

splitting the target physical cell into at least two physical cells; and separately configuring a corresponding baseband tributary for each physical cell of the at least two physical cells that are obtained by splitting.

With reference to the first possible implementation manner of the first aspect of the embodiments of the present invention, in a fourth possible implementation manner of the first aspect of the embodiments of the present invention, when the determining module determines that a target physical cell whose air interface capacity density needs to be reduced exists in the logical cell, a specific manner in which the adjusting module adjusts the air interface capacity density of the target physical cell is:

increasing a quantity of pRRUs in the target physical cell.

With reference to the first possible implementation manner of the first aspect of the embodiments of the present invention, in a fifth possible implementation manner of the first aspect of the embodiments of the present invention, when the determining module determines that a target physical cell whose air interface capacity density needs to be reduced exists in the logical cell, a specific manner in which the adjusting module adjusts the air interface capacity density of the target physical cell is:

combining, into the target physical cell, a physical cell that is adjacent to the target physical cell and whose air interface capacity density needs to be reduced.

With reference to the fourth possible implementation manner of the first aspect of the embodiments of the present invention, in a sixth possible implementation manner of the first aspect of the embodiments of the present invention, a pRRU added to the target physical cell is a pRRU removed from a physical cell that is adjacent to the target physical cell and whose air interface capacity density needs to be increased.

With reference to the second possible implementation manner of the first aspect of the embodiments of the present invention, in a seventh possible implementation manner of the first aspect of the embodiments of the present invention, a pRRU removed from the target physical cell is used to be combined into a physical cell that is adjacent to the target physical cell and whose air interface capacity density needs to be reduced.

A second aspect of the embodiments of the present invention discloses another apparatus for adjusting air interface capacity density, including a memory and a processor, where the memory stores a group of program code and the processor is configured to invoke the program code stored in the memory, to execute the following operations:

determining whether a target physical cell whose air interface capacity density needs to be adjusted exists in a logical cell, where the logical cell includes one or more physical cells, each physical cell includes a group of pico radio remote units (pRRUs), and one physical cell corresponds to one baseband tributary; and if a target physical cell whose air interface capacity density needs to be adjusted exists, adjusting the air interface capacity density of the target physical cell.

In a first possible implementation manner of the second aspect of the embodiments of the present invention, a specific manner in which the processor determines whether a target physical cell whose air interface capacity density needs to be adjusted exists in the logical cell is:

determining whether a target physical cell whose air interface capacity density needs to be reduced exists in the logical cell; or determining whether a target physical cell whose air interface capacity density needs to be increased exists in the logical cell.

With reference to the first possible implementation manner of the second aspect of the embodiments of the present invention, in a second possible implementation manner of the second aspect of the embodiments of the present invention, when the processor determines that a target physical cell whose air interface capacity density needs to be increased exists in the logical cell, a specific manner in which the processor adjusts the air interface capacity density of the target physical cell is:

reducing a quantity of pRRUs in the target physical cell.

With reference to the first possible implementation manner of the second aspect of the embodiments of the present invention, in a third possible implementation manner of the second aspect of the embodiments of the present invention, when the processor determines that a target physical cell whose air interface capacity density needs to be increased exists in the logical cell, a specific manner in which the processor adjusts the air interface capacity density of the target physical cell is:

splitting the target physical cell into at least two physical cells; and separately configuring a corresponding baseband tributary for each physical cell of the at least two physical cells that are obtained by splitting.

With reference to the first possible implementation manner of the second aspect of the embodiments of the present invention, in a fourth possible implementation manner of the second aspect of the embodiments of the present invention, when the processor determines that a target physical cell whose air interface capacity density needs to be reduced exists in the logical cell, a specific manner in which the processor adjusts the air interface capacity density of the target physical cell is:

increasing a quantity of pRRUs in the target physical cell.

With reference to the first possible implementation manner of the second aspect of the embodiments of the present invention, in a fifth possible implementation manner of the second aspect of the embodiments of the present invention, when the processor determines that a target physical cell whose air interface capacity density needs to be reduced exists in the logical cell, a specific manner in which the processor adjusts the air interface capacity density of the target physical cell is:

combining, into the target physical cell, a physical cell that is adjacent to the target physical cell and whose air interface capacity density needs to be reduced.

With reference to the fourth possible implementation manner of the second aspect of the embodiments of the present invention, in a sixth possible implementation manner of the second aspect of the embodiments of the present invention, a pRRU added to the target physical cell is a pRRU removed from a physical cell that is adjacent to the target physical cell and whose air interface capacity density needs to be increased.

With reference to the second possible implementation manner of the second aspect of the embodiments of the present invention, in a seventh possible implementation manner of the second aspect of the embodiments of the present invention, a pRRU removed from the target physical cell is used to be combined into a physical cell that is adjacent to the target physical cell and whose air interface capacity density needs to be reduced.

A third aspect of the embodiments of the present invention discloses a method for adjusting air interface capacity density, including:

determining whether a target physical cell whose air interface capacity density needs to be adjusted exists in a logical cell, where the logical cell includes one or more physical cells, each physical cell includes a group of pico radio remote units (pRRUs), and one physical cell corresponds to one baseband tributary; and if a target physical cell whose air interface capacity density needs to be adjusted exists, adjusting the air interface capacity density of the target physical cell.

In a first possible implementation manner of the third aspect of the embodiments of the present invention, the determining whether a target physical cell whose air interface capacity density needs to be adjusted exists in a logical cell includes:

determining whether a target physical cell whose air interface capacity density needs to be reduced exists in the logical cell; or determining whether a target physical cell whose air interface capacity density needs to be increased exists in the logical cell.

With reference to the first possible implementation manner of the third aspect of the embodiments of the present invention, in a second possible implementation manner of the third aspect of the embodiments of the present invention, if a target physical cell whose air interface capacity density needs to be increased exists, the adjusting the air interface capacity density of the target physical cell includes:

reducing a quantity of pRRUs in the target physical cell.

With reference to the first possible implementation manner of the third aspect of the embodiments of the present invention, in a third possible implementation manner of the third aspect of the embodiments of the present invention, if a target physical cell whose air interface capacity density needs to be increased exists, the adjusting the air interface capacity density of the target physical cell includes:

splitting the target physical cell into at least two physical cells; and separately configuring a corresponding baseband tributary for each physical cell of the at least two physical cells that are obtained by splitting.

With reference to the first possible implementation manner of the third aspect of the embodiments of the present invention, in a fourth possible implementation manner of the third aspect of the embodiments of the present invention, if a target physical cell whose air interface capacity density needs to be reduced exists, the adjusting the air interface capacity density of the target physical cell includes:

increasing a quantity of pRRUs in the target physical cell.

With reference to the first possible implementation manner of the third aspect of the embodiments of the present invention, in a fifth possible implementation manner of the third aspect of the embodiments of the present invention, if a target physical cell whose air interface capacity density needs to be reduced exists, the adjusting the air interface capacity density of the target physical cell includes:

combining, into the target physical cell, a physical cell that is adjacent to the target physical cell and whose air interface capacity density needs to be reduced.

With reference to the fourth possible implementation manner of the third aspect of the embodiments of the present invention, in a sixth possible implementation manner of the third aspect of the embodiments of the present invention, a pRRU added to the target physical cell is a pRRU removed from a physical cell that is adjacent to the target physical cell and whose air interface capacity density needs to be increased.

With reference to the second possible implementation manner of the third aspect of the embodiments of the present invention, in a seventh possible implementation manner of the third aspect of the embodiments of the present invention, a pRRU removed from the target physical cell is used to be combined into a physical cell that is adjacent to the target physical cell and whose air interface capacity density needs to be reduced.

In the embodiments of the present invention, an apparatus for adjusting air interface capacity density first determines whether a target physical cell whose air interface capacity density needs to be adjusted exists in a logical cell, where the logical cell includes one or more physical cells, each physical cell includes a group of pico radio remote units (pRRUs), and one physical cell corresponds to one baseband tributary; and when a determining result is that a target physical cell whose air interface capacity density needs to be adjusted exists in the logical cell, the apparatus for adjusting air interface capacity density adjusts the air interface capacity density of the target physical cell. Therefore, by implementing the embodiments of the present invention, air interface capacity density of a physical cell in a logical cell can be dynamically adjusted according to an actual situation of the physical cell, which improves utilization of an air interface capacity in the logical cell; the logical cell does not need to be split or combined, and no new cell license resource needs to be allocated to the logical cell, which reduces a waste of a cell license resource; and UE in the logical cell does not need to be handed over to a new logical cell, which reduces a quantity of times of service interruption for the UE.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention disclose a method and an apparatus for adjusting air interface capacity density, which can dynamically adjust air interface capacity density of a physical cell in a logical cell according to an actual situation of the physical cell, which improves utilization of an air interface capacity in the logical cell; the logical cell does not need to be split or combined, and no new cell license resource needs to be allocated to the logical cell, which reduces a waste of a cell license resource; and UE in the logical cell does not need to be handed over to a new logical cell, which reduces a quantity of times of service interruption for the UE. Details are separately illustrated in the following.

Figure 1:
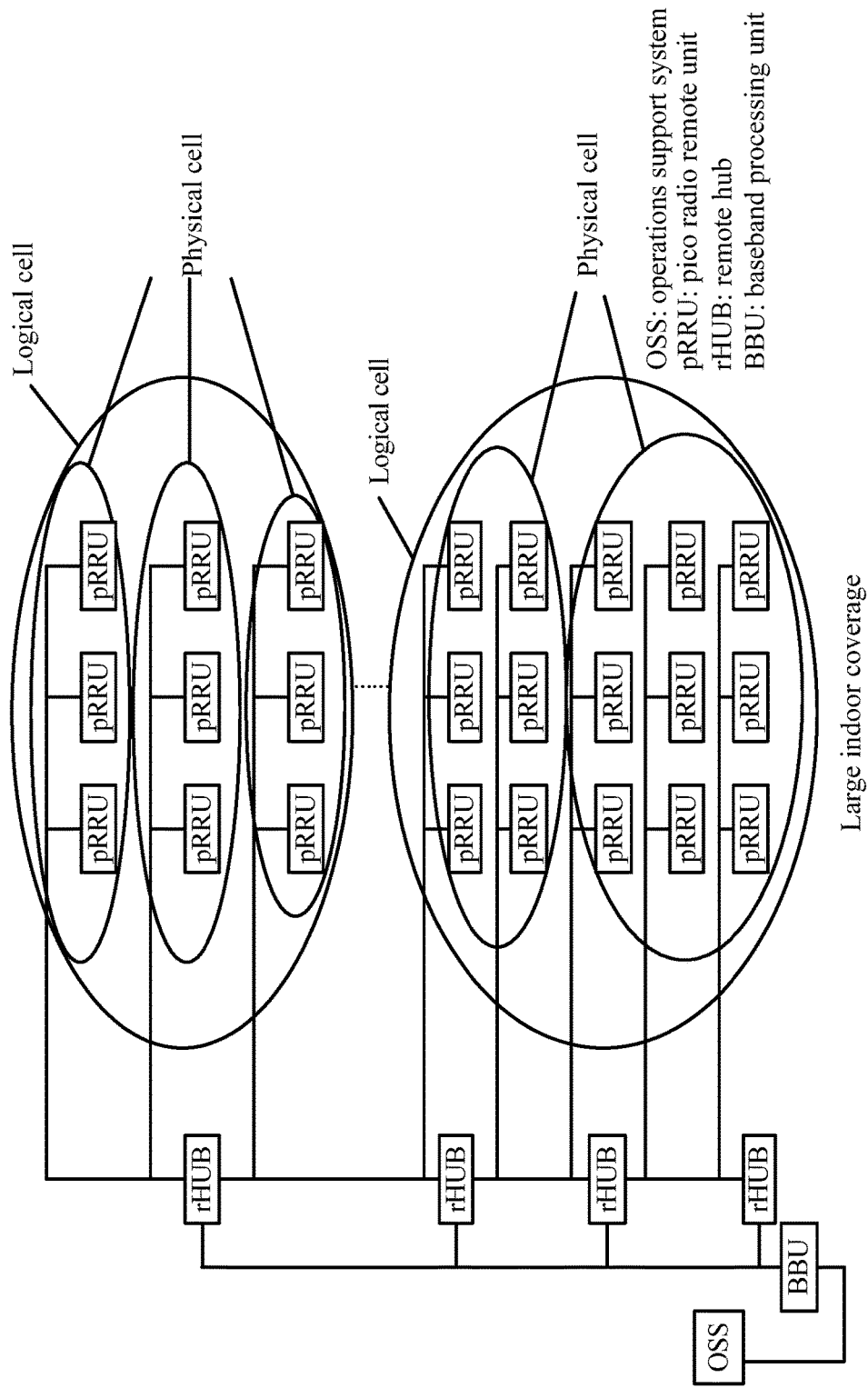
FIG. 1 is a schematic structural diagram of a network architecture disclosed in an embodiment of the present invention.

To better understand the method and the apparatus for adjusting air interface capacity density disclosed in the embodiments of the present invention, the following first describes a network architecture used in the embodiments of the present invention. Referring to FIG. 1, FIG. 1 is a schematic structural diagram of a network architecture disclosed in an embodiment of the present invention. As shown in FIG. 1, the network architecture includes large indoor coverage, and the large indoor coverage is divided into multiple logical cells. Each logical cell has a globally unified cell identity (CI) and cell-related attributes (such as a frequency channel number, bandwidth, a physical cell identifier, and transmit power), and a fixed air interface capacity is deployed for each logical cell. A coverage area of each logical cell may be a coverage area of a uni-directional antenna or may be a coverage area of a multi-directional antenna, and combined radio frequency signals are transmitted between antenna point in the coverage area of each logical cell, that is, the logical cell may also be referred to as a single frequency network (SFN) cell. In addition, each logical cell may further be divided into one or more physical cells, and a physical cell in a logical cell may reuse an air interface capacity in the corresponding logical cell. Air interface capacity density of a physical cell is decreases as a coverage area of the physical cell increases, and air interface capacity density of a physical cell is increases as a coverage area of the physical cell decreases. Each physical cell consists of a group of pico radio remote units (pRRUs) and one physical cell corresponds to one baseband tributary. The baseband tributary in the physical cell is used for baseband modulation and demodulation for an air interface signal in the physical cell.

Figure 2:
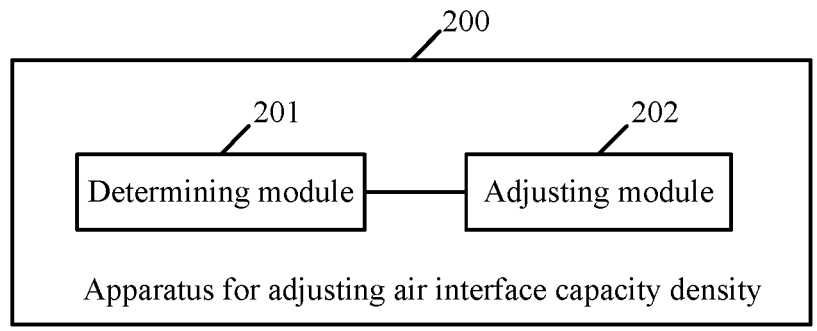
FIG. 2 is a schematic structural diagram of an apparatus for adjusting air interface capacity density disclosed in an embodiment of the present invention.

Based on the network architecture shown in FIG. 1, an embodiment of the present invention discloses an apparatus for adjusting air interface capacity density. Referring to FIG. 2, FIG. 2 is a schematic structural diagram of an apparatus for adjusting air interface capacity density disclosed in an embodiment of the present invention. The apparatus shown in FIG. 2 is applied to a base station. As shown in FIG. 2, an the apparatus 200 for adjusting air interface capacity density may include a determining module 201 and an adjusting module 202.

The determining module 201 is configured to determine whether a target physical cell whose air interface capacity density needs to be adjusted exists in a logical cell.

In this embodiment of the present invention, one logical cell is divided into one or more physical cells, each physical cell consists of a group of pico radio remote units pRRUs, and one physical cell corresponds to one baseband tributary, where the baseband tributary is used for baseband modulation and demodulation for an air interface signal in the physical cell.

In this embodiment of the present invention, air interface capacity density is an air interface capacity per unit area in a physical cell.

As an optional implementation manner, a specific manner in which the determining module 201 determines whether a target physical cell whose air interface capacity density needs to be adjusted exists in the logical cell may be:

determining whether a target physical cell whose air interface capacity density needs to be reduced exists in the logical cell.

In this embodiment of the present invention, the determining module 201 may determine, according to one or more of a user experience satisfaction rate, population distribution, traffic density, and a quantity of loads of each physical cell, whether a target physical cell whose air interface capacity density needs to be reduced exists in the logical cell, and this embodiment of the present invention sets no limitation thereto. For example, when the determining module 201 determines that a user experience satisfaction rate of a physical cell is less than a preset user experience satisfaction rate threshold (for example, 30%), the determining module 201 then identifies the physical cell as a target physical cell whose air interface capacity density needs to be increased. When the determining module 201 determines that a user experience satisfaction rate of a physical cell is greater than a preset user experience satisfaction rate threshold (for example, 90%), the determining module 201 then identifies the physical cell as a target physical cell whose air interface capacity density needs to be reduced.

As another optional implementation manner, a specific manner in which the determining module 201 determines whether a target physical cell whose air interface capacity density needs to be adjusted exists in the logical cell may be:

determining whether a target physical cell whose air interface capacity density needs to be increased exists in the logical cell.

In this embodiment of the present invention, for example, when population density and traffic density in a physical cell are relatively low, the apparatus 200 for adjusting air interface capacity density may reduce air interface capacity density in the physical cell by using the adjusting module 202. When the population density and the traffic density in the physical cell are relatively high, the apparatus 200 for adjusting air interface capacity density may increase the air interface capacity density in the physical cell by using the adjusting module 202.

The adjusting module 202 is configured to: when a determining result of the determining module 201 is that a target physical cell whose air interface capacity density needs to be adjusted exists in the logical cell, adjust the air interface capacity density of the foregoing target physical cell.

As an optional implementation manner, when the determining module 201 determines that a target physical cell whose air interface capacity density needs to be increased exists in the logical cell, a specific manner in which the adjusting module 202 adjusts the air interface capacity density of the target physical cell may be:

reducing a quantity of pRRUs in the target physical cell, so as to increase the air interface capacity density of the target physical cell.

In this embodiment of the present invention, a pRRU removed from the target physical cell is used to be combined into a physical cell that is adjacent to the target physical cell and whose air interface capacity density needs to be reduced.

In this embodiment of the present invention, if air interface capacity density does not need to be adjusted, when sending a downlink signal, the adjusting module 202 allocates a downlink signal corresponding to each physical cell to pRRUs that form the physical cell for sending. When the air interface capacity density of the target physical cell needs to be increased, when sending a downlink signal, the adjusting module 202 allocates a downlink signal corresponding to the target physical cell to some of pRRUs that form the target physical cell for sending, and allocates a downlink signal corresponding to a neighboring physical cell that is adjacent to the target physical cell and whose air interface capacity density needs to be reduced to pRRUs that form the neighboring physical cell and to remaining pRRUs in the target physical cell for sending, so as to reduce the quantity of pRRUs in the target physical cell.

In this embodiment of the present invention, because a physical cell consists of a group of pRRUs, and a quantity of pRRUs determines an actual coverage area of the physical cell. When the quantity of pRRUs is large, the actual coverage area of the physical cell is relatively large. When the quantity of pRRUs is small, the actual coverage area of the physical cell is relatively small. When the quantity of pRRUs in the target physical cell is reduced, the actual coverage area of the target physical cell is reduced, so that the air interface capacity density of the target physical cell is increased, and the pRRU removed from the target physical cell may be combined into a physical cell whose air interface capacity density needs to be reduced.

In this embodiment of the present invention, a quantity of pRRUs removed from the target physical cell is changeable and is determined by population density and traffic density in the target physical cell.

Figure 5:
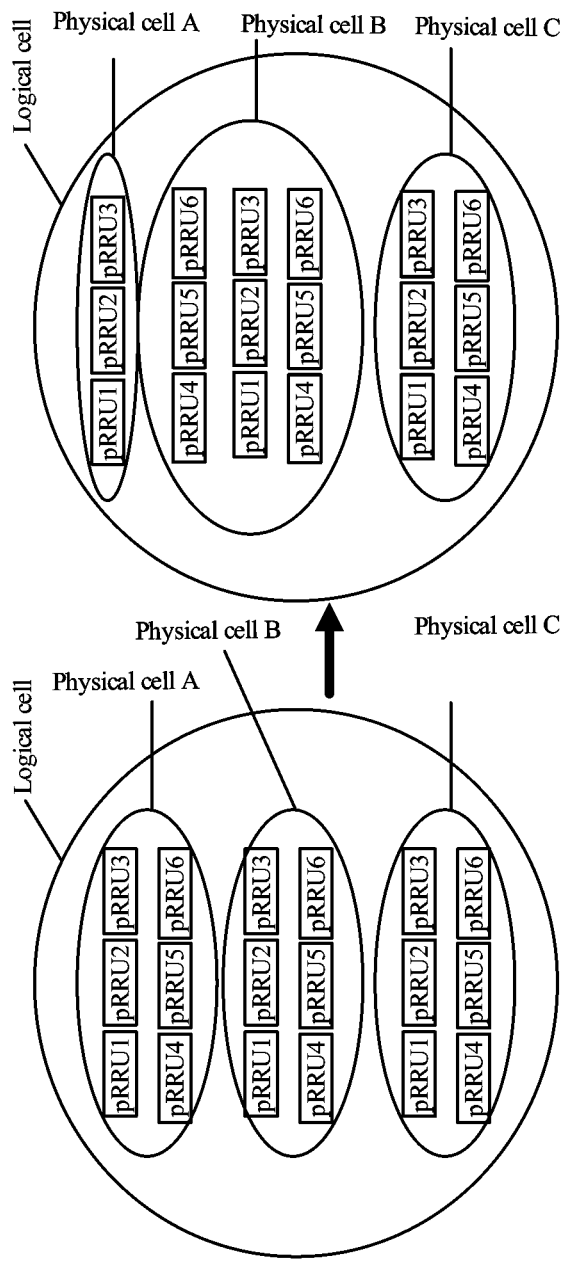
FIG. 5 is a schematic structural diagram of a process of increasing air interface capacity density of a physical cell disclosed in an embodiment of the present invention.

In this embodiment of the present invention, for example, it is assumed that a logical cell is divided into three physical cells, that is, a physical cell A, a physical cell B, and a physical cell C, and each physical cell consists of six pRRUs. When the adjusting module 202 needs to increase air interface capacity density of the physical cell A, and population density and traffic density in the physical cell B are very low, a schematic structural diagram showing a process in which the adjusting module 202 adjusts the air interface capacity density of the target physical cell may be shown in FIG. 5. FIG. 5 is a schematic structural diagram of a process of increasing air interface capacity density of a physical cell disclosed in an embodiment of the present invention. As shown in FIG. 5, the adjusting module 202 combines pRRU4, pRRU5, and pRRU6 that are in the physical cell A into the physical cell B. A quantity of pRRUs in the physical cell A decreases and an actual coverage area of the physical cell A decreases, so that the air interface capacity density of the physical cell A increases. That is, a process in which the adjusting module 202 reduces the quantity of pRRUs in the physical cell A may be described as allocating a downlink signal corresponding to the physical cell A to pRRU1-pRRU3 in an original physical cell A for sending, and allocating a downlink signal corresponding to the physical cell B to pRRU1-pRRU6 in an original physical cell B and to pRRU4-pRRU6 in the original physical cell A for sending.

As another optional implementation manner, when the determining module 201 determines that a target physical cell whose air interface capacity density needs to be increased exists in the logical cell, a specific manner in which the adjusting module 202 adjusts the air interface capacity density of the target physical cell may be:

splitting the target physical cell into at least two physical cells, so as to increase air interface capacity density of each physical cell of the at least two physical cells; and separately configuring a corresponding baseband tributary for each physical cell of the at least two physical cells that are obtained by splitting.

In this embodiment of the present invention, the baseband tributary separately configured for each physical cell of the at least two physical cells that are obtained by splitting may be a baseband tributary of the target physical cell and a baseband tributary that is idle after one or more physical cells in the logical cell are combined, may be a baseband tributary reallocated by the apparatus 200 for adjusting air interface capacity density, or may further be a combination thereof, which is not limited in this embodiment of the present invention.

In this embodiment of the present invention, the adjusting module 202 splits the target physical cell into at least two physical cells, so that an actual coverage area of each physical cell that is obtained by splitting the target physical cell decreases, and air interface capacity density of each physical cell that is obtained by splitting the target physical cell increases.

In this embodiment of the present invention, a quantity of physical cells that are obtained by splitting the target physical cell is changeable and is determined by the population density and the traffic density in the target physical cell.

Figure 6:
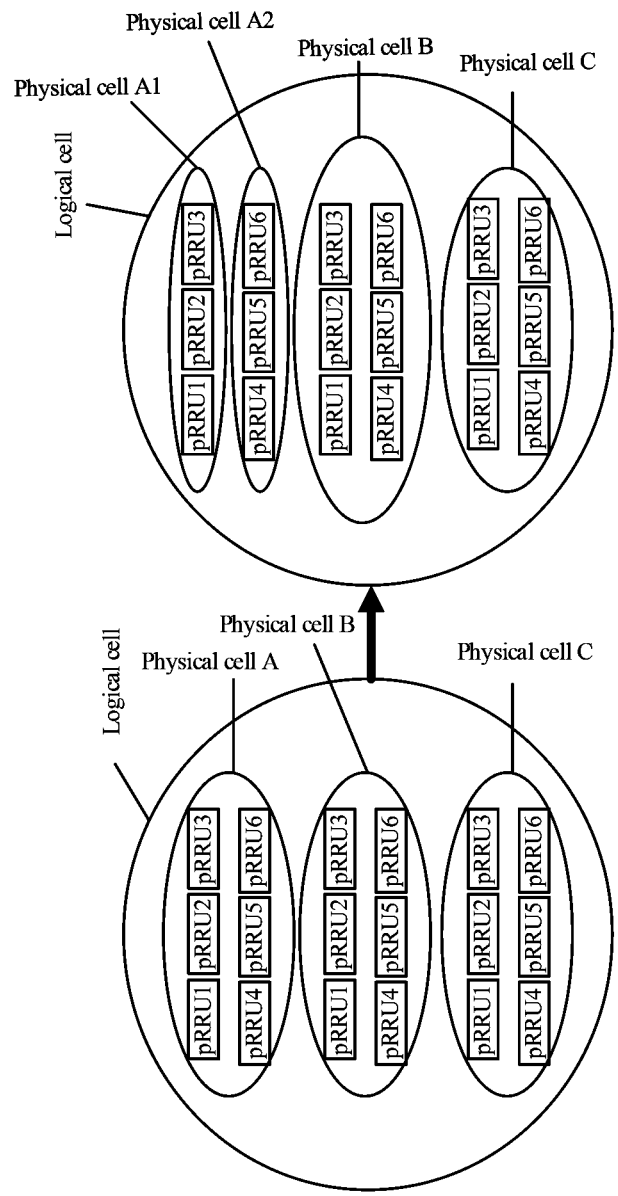
FIG. 6 is another schematic structural diagram of a process of increasing air interface capacity density of a physical cell disclosed in an embodiment of the present invention.

In this embodiment of the present invention, for example, it is assumed that a logical cell is divided into three physical cells, that is, a physical cell A, a physical cell B, and a physical cell C, and each physical cell consists of six pRRUs. When the adjusting module 202 needs to increase air interface capacity density of the physical cell A, a schematic structural diagram showing a process in which the adjusting module 202 adjusts the air interface capacity density of the target physical cell may be shown in FIG. 6. FIG. 6 is another schematic structural diagram of a process of increasing air interface capacity density of a physical cell disclosed in an embodiment of the present invention. As shown in FIG. 6, the adjusting module 202 splits the physical cell A into two physical cells, that is, a physical cell A1 and a physical cell A2. The physical cell A1 consists of pRRU1, pRRU2, and pRRU3 that are in the physical cell A, and the physical cell A2 consists of pRRU4, pRRU5, and pRRU6 that are in the physical cell A. That is, a process in which the adjusting module 202 splits the physical cell A into the two physical cells (the physical cell A1 and the physical cell A2) may be described as allocating a downlink signal corresponding to an original physical cell A to pRRU1-pRRU3 in the original physical cell A for sending, or allocating a downlink signal corresponding to the original physical cell A to pRRU4-pRRU6 in the original physical cell A for sending, that is, separating the downlink signal that is sent by pRRU1-pRRU3 in the original physical cell A from the downlink signal that is sent by pRRU4-pRRU6 in the original physical cell A, to implement splitting of the original physical cell A.

As an optional implementation manner, when the determining module 201 determines that a target physical cell whose air interface capacity density needs to be reduced exists in the logical cell, a specific manner in which the adjusting module 202 adjusts the air interface capacity density of the target physical cell may be:

increasing a quantity of pRRUs in the target physical cell, so as to reduce the air interface capacity density of the target physical cell.

In this embodiment of the present invention, a quantity of pRRUs added to the target physical cell is changeable and is determined by the population density and the traffic density in the target physical cell.

In this embodiment of the present invention, the target physical cell whose air interface capacity density needs to be reduced may combine, into the target physical cell, a pRRU removed from a physical cell that is adjacent to the target physical cell and whose air interface capacity density needs to be increased, so as to increase the quantity of pRRUs in the target physical cell. For example, as shown in FIG. 5, the physical cell B combines a pRRU removed from the physical cell A into the physical cell B, so as to increase a quantity of pRRUs of the physical cell B, so that air interface capacity density of the physical cell B decreases.

As another optional implementation manner, when the determining module 201 determines that a target physical cell whose air interface capacity density needs to be reduced exists in the logical cell, a specific manner in which the adjusting module 202 adjusts the air interface capacity density of the target physical cell may be:

combining, into the target physical cell, a physical cell that is adjacent to the target physical cell and whose air interface capacity density needs to be reduced, so as to reduce the air interface capacity density of the target physical cell.

In this embodiment of the present invention, in the logical cell, an idle baseband tributary is available after two physical cells are combined, and the idle baseband tributary after the physical cells are combined may be used to be set as a baseband tributary of a physical cell obtained by splitting a physical cell.

Figure 7:
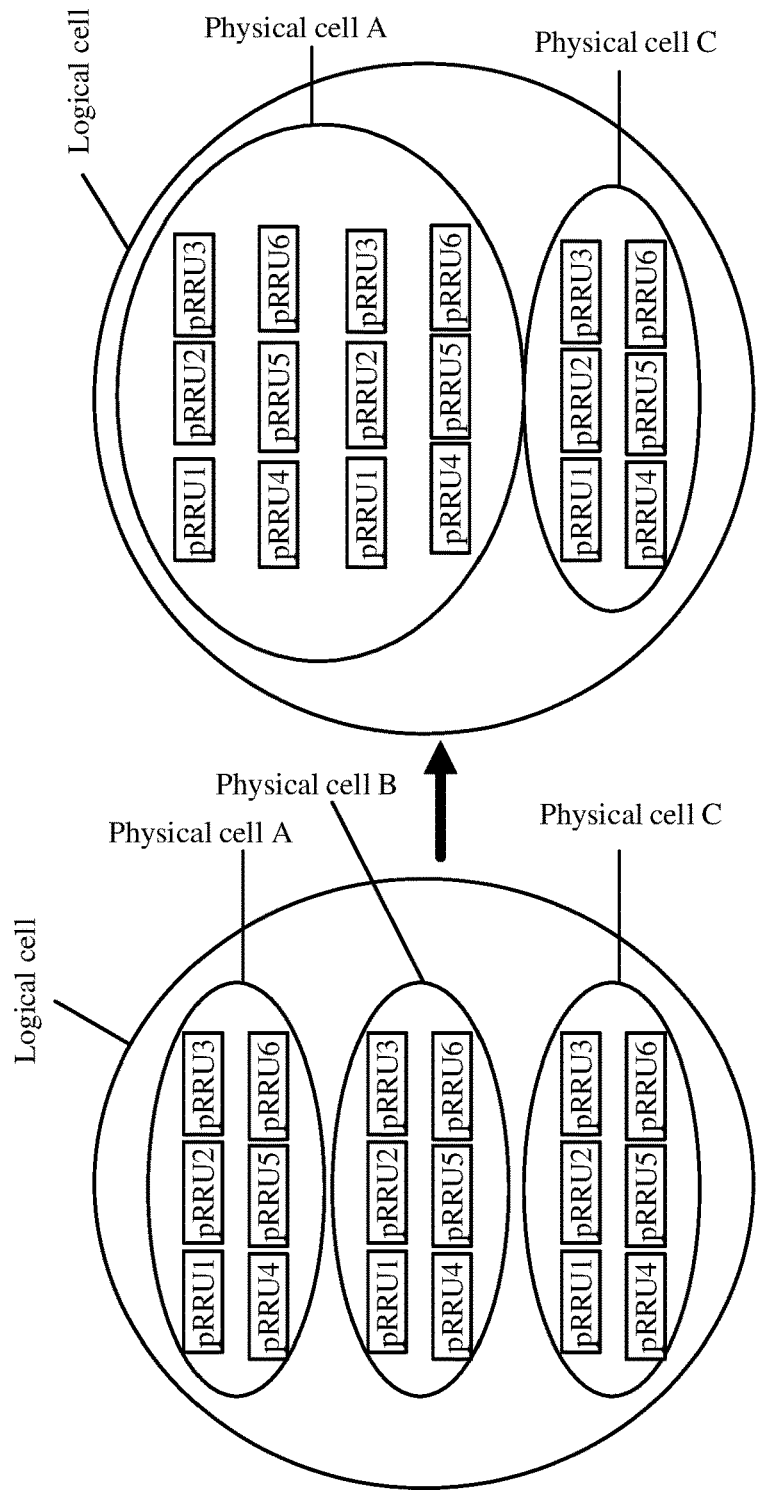
FIG. 7 is a schematic structural diagram of a process of reducing air interface capacity density of a physical cell disclosed in an embodiment of the present invention.

In this embodiment of the present invention, for example, it is assumed that a logical cell is divided into three physical cells, that is, a physical cell A, a physical cell B, and a physical cell C, and each physical cell consists of six pRRUs. When the adjusting module 202 needs to reduce air interface capacity density of the physical cell A, and the physical cell B is a physical cell whose air interface capacity density needs to be reduced, a schematic structural diagram showing a process in which the adjusting module 202 adjusts the air interface capacity density of the target physical cell may be shown in FIG. 7. FIG. 7 is a schematic structural diagram of a process of reducing air interface capacity density of a physical cell disclosed in an embodiment of the present invention. As shown in FIG. 7, the adjusting module 202 combines the physical cell B into the physical cell A, so that a quantity of pRRUs in the physical cell A increases, and the air interface capacity density of the physical cell A decreases. That is, a process in which the adjusting module 202 combines the physical cell B into the physical cell A may be described as allocating a downlink signal corresponding to an original physical cell A to pRRU1-pRRU6 in the original physical cell A and to pRRU1-pRRU6 in an original physical cell B for sending.

By implementing this embodiment of the present invention, air interface capacity density of a physical cell in a logical cell can be dynamically adjusted according to an actual situation of the physical cell, which improves utilization of an air interface capacity in the logical cell; the logical cell does not need to be split or combined, and no new cell license resource needs to be allocated to the logical cell, which reduces a waste of a cell license resource; and UE in the logical cell does not need to be handed over to a new logical cell, which reduces a quantity of times of service interruption for the UE.

Figure 3:
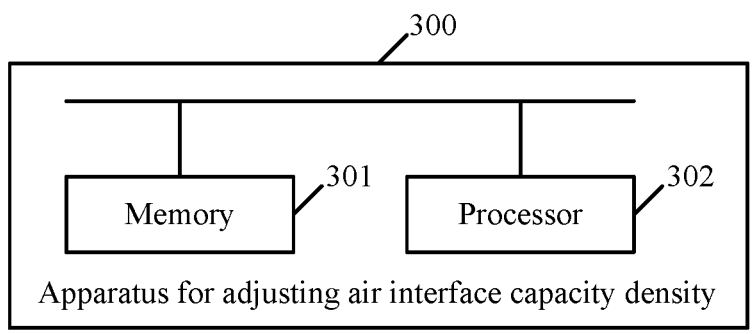
FIG. 3 is a schematic structural diagram of another apparatus for adjusting air interface capacity density disclosed in an embodiment of the present invention.

Based on the network architecture shown in FIG. 1, an embodiment of the present invention discloses another apparatus for adjusting air interface capacity density. Referring to FIG. 3, FIG. 3 is a schematic structural diagram of another apparatus for adjusting air interface capacity density disclosed in an embodiment of the present invention. The apparatus shown in FIG. 3 is applied to a base station. As shown in FIG. 3, an apparatus 300 for adjusting air interface capacity density includes a memory 301 and a processor 302, where the memory 301 stores a group of program code and the processor 302 is configured to invoke the program code stored in the memory 301, to execute the following operations:

determining whether a target physical cell whose air interface capacity density needs to be adjusted exists in a logical cell, where the logical cell includes one or more physical cells, each physical cell includes a group of pico radio remote units pRRUs, and one physical cell corresponds to one baseband tributary; and if a target physical cell whose air interface capacity density needs to be adjusted exists, adjusting the air interface capacity density of the target physical cell.

In this embodiment of the present invention, air interface capacity density is an air interface capacity per unit area in a physical cell.

In an embodiment, a specific manner in which the processor 302 determines whether a target physical cell whose air interface capacity density needs to be adjusted exists in the logical cell may be:

determining whether a target physical cell whose air interface capacity density needs to be reduced exists in the logical cell; or determining whether a target physical cell whose air interface capacity density needs to be increased exists in the logical cell.

In an embodiment, when the processor 302 determines that a target physical cell whose air interface capacity density needs to be increased exists in the logical cell, a specific manner in which the processor 302 adjusts the air interface capacity density of the target physical cell may be:

reducing a quantity of pRRUs in the target physical cell, so as to increase the air interface capacity density of the target physical cell.

In this embodiment of the present invention, a quantity of pRRUs removed from the target physical cell is changeable and is determined by population density and traffic density in the target physical cell, and a pRRU removed from the target physical cell is used to be combined into a physical cell that is adjacent to the target physical cell and whose air interface capacity density needs to be reduced.

In an embodiment, when the processor 302 determines that a target physical cell whose air interface capacity density needs to be increased exists in the logical cell, a specific manner in which the processor 302 adjusts the air interface capacity density of the target physical cell may be:

splitting the target physical cell into at least two physical cells, so as to increase air interface capacity density of each physical cell of the at least two physical cells; and separately configuring a corresponding baseband tributary for each physical cell of the at least two physical cells that are obtained by splitting.

In this embodiment of the present invention, a quantity of physical cells that are obtained by splitting the target physical cell is changeable and is determined by the population density and the traffic density in the target physical cell.

In an embodiment, when the processor 302 determines that a target physical cell whose air interface capacity density needs to be reduced exists in the logical cell, a specific manner in which the processor 302 adjusts the air interface capacity density of the target physical cell is:

increasing a quantity of pRRUs in the target physical cell, so as to reduce the air interface capacity density of the target physical cell.

In this embodiment of the present invention, a quantity of pRRUs added to the target physical cell is changeable and is determined by the population density and the traffic density in the target physical cell, and the target physical cell whose air interface capacity density needs to be reduced may combine, into the target physical cell, a pRRU removed from a physical cell that is adjacent to the target physical cell and whose air interface capacity density needs to be increased, so as to increase the quantity of pRRUs in the target physical cell.

In an embodiment, when the processor 302 determines that a target physical cell whose air interface capacity density needs to be reduced exists in the logical cell, a specific manner in which the processor 302 adjusts the air interface capacity density of the target physical cell is:

combining, into the target physical cell, a physical cell that is adjacent to the target physical cell and whose air interface capacity density needs to be reduced, so as to reduce the air interface capacity density of the target physical cell.

In this embodiment of the present invention, in the logical cell, an idle baseband tributary is available after two physical cells are combined, and the idle baseband tributary after the physical cells are combined may be used to be set as a baseband tributary of a physical cell obtained by splitting a physical cell.

By implementing this embodiment of the present invention, air interface capacity density of a physical cell in a logical cell can be dynamically adjusted according to an actual situation of the physical cell, which improves utilization of an air interface capacity in the logical cell; the logical cell does not need to be split or combined, and no new cell license resource needs to be allocated to the logical cell, which reduces a waste of a cell license resource; and UE in the logical cell does not need to be handed over to a new logical cell, which reduces a quantity of times of service interruption for the UE.

Figure 4:
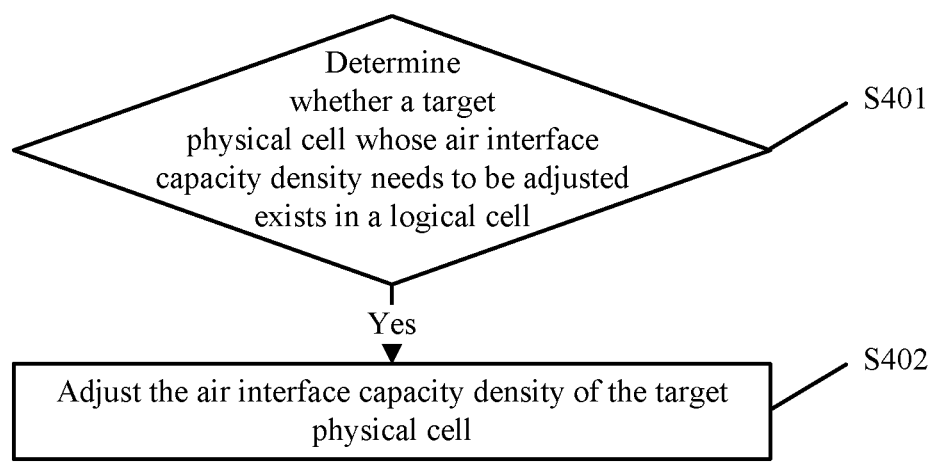
FIG. 4 is a schematic flowchart of a method for adjusting air interface capacity density disclosed in an embodiment of the present invention.

Based on the network architecture shown in FIG. 1, an embodiment of the present invention discloses a method for adjusting air interface capacity density. Referring to FIG. 4, FIG. 4 is a schematic flowchart of a method for adjusting air interface capacity density disclosed in an embodiment of the present invention. The method shown in FIG. 4 is applied to a base station. As shown in FIG. 4, the method for adjusting air interface capacity density may include the following steps:

S401. Determine whether a target physical cell whose air interface capacity density needs to be adjusted exists in a logical cell.

In this embodiment of the present invention, one logical cell is divided into one or more physical cells, each physical cell consists of a group of pico radio remote units pRRUs, and one physical cell corresponds to one baseband tributary, where the baseband tributary is used for baseband modulation and demodulation for an air interface signal in the physical cell.

In this embodiment of the present invention, air interface capacity density is an air interface capacity per unit area in a physical cell.

As an optional implementation manner, the determining whether a target physical cell whose air interface capacity density needs to be adjusted exists in a logical cell may include:

determining whether a target physical cell whose air interface capacity density needs to be reduced exists in the logical cell.

In this embodiment of the present invention, an apparatus for adjusting air interface capacity density may determine, according to one or more of a user experience satisfaction rate, population distribution, traffic density, and a quantity of loads of each physical cell, whether a target physical cell whose air interface capacity density needs to be reduced exists in the logical cell, and this embodiment of the present invention sets no limitation thereto. For example, when the apparatus for adjusting air interface capacity density determines that a user experience satisfaction rate of a physical cell is less than a preset user experience satisfaction rate threshold (for example, 30%), the apparatus for adjusting air interface capacity density then identifies the physical cell as a target physical cell whose air interface capacity density needs to be increased. When the apparatus for adjusting air interface capacity density determines that a user experience satisfaction rate of a physical cell is greater than a preset user experience satisfaction rate threshold (for example, 90%), the apparatus for adjusting air interface capacity density then identifies the physical cell as a target physical cell whose air interface capacity density needs to be reduced.

As another optional implementation manner, the determining whether a target physical cell whose air interface capacity density needs to be adjusted exists in a logical cell may include:

determining whether a target physical cell whose air interface capacity density needs to be increased exists in the logical cell.

In this embodiment of the present invention, for example, when population density and traffic density in a physical cell are relatively low, the apparatus for adjusting air interface capacity density may reduce air interface capacity density in the physical cell. When the population density and the traffic density in the physical cell are relatively high, the apparatus for adjusting air interface capacity density may increase the air interface capacity density in the physical cell.

In this embodiment of the present invention, when a determining result in step S401 is that a target physical cell whose air interface capacity density needs to be adjusted exists in the logical cell, the apparatus for adjusting air interface capacity density executes step S402. When a determining result in step S401 is that no target physical cell whose air interface capacity density needs to be adjusted exists in the logical cell, the apparatus for adjusting air interface capacity density may terminate the current procedure.

S402. Adjust the air interface capacity density of the target physical cell.

As an optional implementation manner, when a target physical cell whose air interface capacity density needs to be increased exists in the logical cell, the adjusting the air interface capacity density of the target physical cell may include:

reducing a quantity of pRRUs in the target physical cell, so as to increase the air interface capacity density of the target physical cell.

In this embodiment of the present invention, a pRRU removed from the target physical cell is used to be combined into a physical cell that is adjacent to the target physical cell and whose air interface capacity density needs to be reduced.

In this embodiment of the present invention, in a case in which air interface capacity density does not need to be adjusted, when sending a downlink signal, the apparatus for adjusting air interface capacity density allocates a downlink signal corresponding to each physical cell to pRRUs that form the physical cell for sending. When the air interface capacity density of the target physical cell needs to be increased, when sending a downlink signal, the apparatus for adjusting air interface capacity density allocates a downlink signal corresponding to the target physical cell to some of pRRUs that form the target physical cell for sending, and allocates a downlink signal corresponding to a neighboring physical cell that is adjacent to the target physical cell and whose air interface capacity density needs to be reduced to pRRUs that form the neighboring physical cell and to remaining pRRUs in the target physical cell for sending, so as to reduce the quantity of pRRUs in the target physical cell.

In this embodiment of the present invention, because a physical cell consists of a group of pRRUs, and a quantity of pRRUs determines an actual coverage area of the physical cell. When the quantity of pRRUs is large, the actual coverage area of the physical cell is relatively large. When the quantity of pRRUs is relatively small, the actual coverage area of the physical cell is relatively small. When the quantity of pRRUs in the target physical cell is reduced, the actual coverage area of the target physical cell is reduced, so that the air interface capacity density of the target physical cell is increased, and the pRRU removed from the target physical cell may be combined into a physical cell whose air interface capacity density needs to be reduced.

In this embodiment of the present invention, a quantity of pRRUs removed from the target physical cell is changeable and is determined by population density and traffic density in the target physical cell.

In this embodiment of the present invention, for example, it is assumed that a logical cell is divided into three physical cells, that is, a physical cell A, a physical cell B, and a physical cell C, and each physical cell consists of six pRRUs. When the apparatus for adjusting air interface capacity density needs to increase air interface capacity density of the physical cell A, and population density and traffic density in the physical cell B are very low, a schematic structural diagram showing a process in which the apparatus for adjusting air interface capacity density adjusts the air interface capacity density of the target physical cell may be shown in FIG. 5. FIG. 5 is a schematic structural diagram of a process of increasing air interface capacity density of a physical cell disclosed in an embodiment of the present invention. As shown in FIG. 5, the apparatus for adjusting air interface capacity density combines pRRU4, pRRU5, and pRRU6 that are in the physical cell A into the physical cell B. A quantity of pRRUs in the physical cell A decreases and an actual coverage area of the physical cell A decreases, so that the air interface capacity density of the physical cell A increases. That is, a process in which the apparatus for adjusting air interface capacity density reduces the quantity of pRRUs in the physical cell A may be described as allocating a downlink signal corresponding to the physical cell A to pRRU1-pRRU3 in an original physical cell A for sending, and allocating a downlink signal corresponding to the physical cell B to pRRU1-pRRU6 in an original physical cell B and to pRRU4-pRRU6 in the original physical cell A for sending.

As another optional implementation manner, when a target physical cell whose air interface capacity density needs to be increased exists in the logical cell, the adjusting the air interface capacity density of the target physical cell may include:

splitting the target physical cell into at least two physical cells, so as to increase air interface capacity density of each physical cell of the at least two physical cells; and separately configuring a corresponding baseband tributary for each physical cell of the at least two physical cells that are obtained by splitting.

In this embodiment of the present invention, the baseband tributary separately configured for each physical cell of the at least two physical cells that are obtained by splitting may be a baseband tributary of the target physical cell and a baseband tributary that is idle after one or more physical cells in the logical cell are combined, may be a baseband tributary reallocated by the apparatus for adjusting air interface capacity density, or may further be a combination thereof, which is not limited in this embodiment of the present invention.

In this embodiment of the present invention, the apparatus for adjusting air interface capacity density splits the target physical cell into the at least two physical cells, so that an actual coverage area of each physical cell that is obtained by splitting the target physical cell decreases, and air interface capacity density of each physical cell that is obtained by splitting the target physical cell increases.

In this embodiment of the present invention, a quantity of physical cells that are obtained by splitting the target physical cell is changeable and is determined by the population density and the traffic density in the target physical cell.

In this embodiment of the present invention, for example, it is assumed that a logical cell is divided into three physical cells, that is, a physical cell A, a physical cell B, and a physical cell C, and each physical cell consists of six pRRUs. When the apparatus for adjusting air interface capacity density needs to increase air interface capacity density of the physical cell A, a schematic structural diagram showing a process in which the apparatus for adjusting air interface capacity density adjusts the air interface capacity density of the target physical cell may be shown in FIG. 6. FIG. 6 is another schematic structural diagram of a process of increasing air interface capacity density of a physical cell disclosed in an embodiment of the present invention. As shown in FIG. 6, the apparatus for adjusting air interface capacity density splits the physical cell A into two physical cells, that is, a physical cell A1 and a physical cell A2. The physical cell A1 consists of pRRU1, pRRU2, and pRRU3 that are in the physical cell A, and the physical cell A2 consists of pRRU4, pRRU5, and pRRU6 that are in the physical cell A. That is, a process in which the apparatus for adjusting air interface capacity density splits the physical cell A into the two physical cells (the physical cell A1 and the physical cell A2) may be described as allocating a downlink signal corresponding to an original physical cell A to pRRU1-pRRU3 in the original physical cell A for sending, or allocating a downlink signal corresponding to the original physical cell A to pRRU4-pRRU6 in the original physical cell A for sending, that is, separating the downlink signal that is sent by pRRU1-pRRU3 in the original physical cell A from the downlink signal that is sent by pRRU4-pRRU6 in the original physical cell A, to implement splitting of the original physical cell A.

As an optional implementation manner, when a target physical cell whose air interface capacity density needs to be reduced exists in the logical cell, the adjusting the air interface capacity density of the target physical cell may include:

increasing a quantity of pRRUs in the target physical cell, so as to reduce the air interface capacity density of the target physical cell.

In this embodiment of the present invention, a quantity of pRRUs added to the target physical cell is changeable and is determined by the population density and the traffic density in the target physical cell.

In this embodiment of the present invention, the target physical cell whose air interface capacity density needs to be reduced may combine, into the target physical cell, a pRRU removed from a physical cell that is adjacent to the target physical cell and whose air interface capacity density needs to be increased, so as to increase the quantity of pRRUs in the target physical cell. For example, as shown in FIG. 5, the physical cell B combines a pRRU removed from the physical cell A into the physical cell B, so as to increase a quantity of pRRUs of the physical cell B, so that air interface capacity density of the physical cell B decreases.

As another optional implementation manner, when a target physical cell whose air interface capacity density needs to be reduced exists in the logical cell, the adjusting the air interface capacity density of the target physical cell may include:

combining, into the target physical cell, a physical cell that is adjacent to the target physical cell and whose air interface capacity density needs to be reduced, so as to reduce the air interface capacity density of the target physical cell.

In this embodiment of the present invention, in the logical cell, an idle baseband tributary is available after two physical cells are combined, and the idle baseband tributary after the physical cells are combined may be used to be set as a baseband tributary of a physical cell obtained by splitting a physical cell.

In this embodiment of the present invention, for example, it is assumed that a logical cell is divided into three physical cells, that is, a physical cell A, a physical cell B, and a physical cell C, and each physical cell consists of six pRRUs. When the apparatus for adjusting air interface capacity density needs to reduce air interface capacity density of the physical cell A and the physical cell B is a physical cell whose air interface capacity density needs to be reduced, a schematic structural diagram showing a process in which the apparatus for adjusting air interface capacity density adjusts the air interface capacity density of the target physical cell may be shown in FIG. 7. FIG. 7 is a schematic structural diagram of a process of reducing air interface capacity density of a physical cell disclosed in an embodiment of the present invention. As shown in FIG. 7, the apparatus for adjusting air interface capacity density combines the physical cell B into the physical cell A, so that a quantity of pRRUs in the physical cell A increases, and the air interface capacity density of the physical cell A decreases. That is, a process in which the apparatus for adjusting air interface capacity density combines the physical cell B into the physical cell A may be described as allocating a downlink signal corresponding to an original physical cell A to pRRU1-pRRU6 in the original physical cell A and to pRRU1-pRRU6 in an original physical cell B for sending.

In this embodiment of the present invention, an apparatus for adjusting air interface capacity density first determines whether a target physical cell whose air interface capacity density needs to be adjusted exists in a logical cell, where the logical cell is divided into one or more physical cells, each physical cell consists of a group of pico radio remote units pRRUs, and one physical cell corresponds to one baseband tributary; and when a determining result is that a target physical cell whose air interface capacity density needs to be adjusted exists in the logical cell, the apparatus for adjusting air interface capacity density adjusts the air interface capacity density of the target physical cell. Therefore, by implementing this embodiment of the present invention, air interface capacity density of a physical cell in a logical cell can be dynamically adjusted according to an actual situation of the physical cell, which improves utilization of an air interface capacity in the logical cell; the logical cell does not need to be split or combined, and no new cell license resource needs to be allocated to the logical cell, which reduces a waste of a cell license resource; and UE in the logical cell does not need to be handed over to a new logical cell, which reduces a quantity of times of service interruption for the UE.

It should be noted that in the foregoing embodiments, the description of each embodiment has respective focuses. For a part that is not described in detail in an embodiment, reference may be made to related descriptions in other embodiments. In addition, a person skilled in the art should also understand that all the embodiments described in this specification are exemplary embodiments, and the involved actions and modules are not necessarily mandatory for the present invention.

A sequence of the steps of the method in the embodiments of the present invention may be adjusted, and certain steps may be combined or omitted according to an actual need.

The modules in the embodiments of the present invention may be combined, divided, or omitted according to an actual need.

The modules in the embodiments of the present invention may be implemented by a universal integrated circuit, such as a central processing unit (CPU) or an application specific integrated circuit (ASIC).

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may be a magnetic disk, an optical disc, a read-only memory (ROM), a random access memory (RAM), or the like.

The foregoing describes in detail the method and the apparatus for adjusting air interface capacity density disclosed in the embodiments of the present invention. In this specification, specific examples are used to illustrate the principle and implementation manners of the present invention, and the foregoing description of the embodiments is intended only to help understand the present invention and a core idea of the present invention. In addition, a person of ordinary skill in the art may, according to the idea of the present invention, make modifications with respect to the specific implementation manners and the application scope. In conclusion, the content of this specification shall not be construed as a limitation on the present invention.

What is claimed is:

1. An apparatus for adjusting air interface capacity density, comprising a memory and a processor, wherein the memory stores program code and the processor is configured to invoke the program code stored in the memory, to execute the following operations:

determining whether a target physical cell having an air interface capacity density that needs to be adjusted exists in a logical cell, wherein the logical cell comprises one or more physical cells, each physical cell comprises a group of pico radio remote units (pRRUs), and one physical cell corresponds to one baseband tributary;

when a target physical cell having the air interface capacity density that needs to be adjusted exists, adjusting the air interface capacity density of the target physical cell by reducing or increasing a quantity of pRRUs in the target cell to a new quantity of pRRUs and allocating a downlink signal to the new quantity of pRRUs in the target cell; and handling a communication of a user equipment (UE) using the target cell.

2. The apparatus according to claim 1, wherein a specific manner in which the processor determines whether a target physical cell having the air interface capacity density that needs to be adjusted exists in the logical cell is:

determining whether a target physical cell having an air interface capacity density that needs to be reduced exists in the logical cell; or determining whether a target physical cell having an air interface capacity density that needs to be increased exists in the logical cell.

3. The apparatus according to claim 2, wherein when the processor determines that a target physical cell having the air interface capacity density that needs to be increased exists in the logical cell, a specific manner in which the processor adjusts the air interface capacity density of the target physical cell is:

reducing the quantity of pRRUs in the target physical cell.

4. The apparatus according to claim 2, wherein when the processor determines that a target physical cell having the air interface capacity density that needs to be increased exists in the logical cell, a specific manner in which the processor adjusts the air interface capacity density of the target physical cell is:

splitting the target physical cell into at least two physical cells; and separately configuring a corresponding baseband tributary for each physical cell of the at least two physical cells that are obtained by splitting.

5. The apparatus according to claim 2, wherein when the processor determines that a target physical cell having the air interface capacity density that needs to be reduced exists in the logical cell, a specific manner in which the processor adjusts the air interface capacity density of the target physical cell is:

increasing the quantity of pRRUs in the target physical cell.

6. The apparatus according to claim 2, wherein when the processor determines that a target physical cell having the air interface capacity density that needs to be reduced exists in the logical cell, a specific manner in which the processor adjusts the air interface capacity density of the target physical cell is:

combining, into the target physical cell, a physical cell that is adjacent to the target physical cell and which has an air interface capacity density that needs to be reduced.

7. The apparatus according to claim 5, wherein a pRRU added to the target physical cell is a pRRU removed from a physical cell that is adjacent to the target physical cell and which has an air interface capacity density that needs to be increased.

8. The apparatus according to claim 3, wherein a pRRU removed from the target physical cell is used to be combined into a physical cell that is adjacent to the target physical cell and which has an air interface capacity density that needs to be reduced.

9. A method for adjusting air interface capacity density, comprising:

determining whether a target physical cell having an air interface capacity density that needs to be adjusted exists in a logical cell, wherein the logical cell comprises one or more physical cells, each physical cell comprises a plurality of pico radio remote units (pRRUs), and one physical cell corresponds to one baseband tributary; and when a target physical cell having the air interface capacity density that needs to be adjusted exists, adjusting the air interface capacity density of the target physical cell by reducing or increasing a quantity of pRRUs in the target cell to a new quantity of pRRUs and allocating a downlink signal to the new quantity of pRRUs in the target cell; and handling a communication of a user equipment (UE) using the target cell.

10. The method according to claim 9, wherein the determining whether a target physical cell having the air interface capacity density that needs to be adjusted exists in a logical cell comprises:

determining whether a target physical cell having an air interface capacity density that needs to be reduced exists in the logical cell; or determining whether a target physical cell having an air interface capacity density that needs to be increased exists in the logical cell.

11. The method according to claim 10, wherein when a target physical cell having the air interface capacity density that needs to be increased exists, the adjusting the air interface capacity density of the target physical cell comprises:

reducing the quantity of pRRUs in the target physical cell.

12. The method according to claim 10, wherein when a target physical cell having the air interface capacity density that needs to be increased exists, the adjusting the air interface capacity density of the target physical cell comprises:

splitting the target physical cell into at least two physical cells; and separately configuring a corresponding baseband tributary for each physical cell of the at least two physical cells that are obtained by splitting.

13. The method according to claim 10, wherein when a target physical cell having the air interface capacity density that needs to be reduced exists, the adjusting the air interface capacity density of the target physical cell comprises:

increasing the quantity of pRRUs in the target physical cell.

14. The method according to claim 10, wherein when a target physical cell having the air interface capacity density that needs to be reduced exists, the adjusting the air interface capacity density of the target physical cell comprises:

combining, into the target physical cell, a physical cell that is adjacent to the target physical cell and which has an air interface capacity density that needs to be reduced.

15. The method according to claim 13, wherein a pRRU added to the target physical cell is a pRRU removed from a physical cell that is adjacent to the target physical cell and which has an air interface capacity density that needs to be increased.

16. The method according to claim 11, wherein a pRRU removed from the target physical cell is used to be combined into a physical cell that is adjacent to the target physical cell and which has an air interface capacity density that needs to be reduced.

17. A non-transitory computer-readable storage medium comprising instructions which, when executed by a computer, cause the computer to carry out the method of adjusting air interface capacity density, by: determining whether a target physical cell having an air interface capacity density that needs to be adjusted exists in a logical cell, wherein the logical cell comprises one or more physical cells, each physical cell comprises a plurality of pico radio remote units (pRRUs), and one physical cell corresponds to one baseband tributary; and when a target physical cell having the air interface capacity density that needs to be adjusted exists, adjusting the air interface capacity density of the target physical cell by reducing or increasing a quantity of pRRUs in the target cell to a new quantity of pRRUs and allocating a downlink signal to the new quantity of pRRUs in the target cell; and handling a communication of a user equipment (UE) using the target cell.

18. The computer-readable storage medium of claim 17, wherein when a target physical cell having the air interface capacity density that needs to be reduced exists, the instructions which, when executed by a computer, that cause the computer to adjust the air interface capacity density of the target physical cell comprise instructions to increase the quantity of pRRUs in the target physical cell.

19. The computer-readable storage medium of claim 17, wherein when a target physical cell having the air interface capacity density that needs to be increased exists, the instructions which, when executed by a computer, that cause the computer to adjust the air interface capacity density of the target physical cell comprise instructions to decrease the quantity of pRRUs in the target physical cell.

* * * * *